(12) United States Patent
Naik

(10) Patent No.: US 7,142,972 B1
(45) Date of Patent: Nov. 28, 2006

(54) CONTINUOUS CYLINDER MISFIRE DETECTION METHOD

(75) Inventor: Sanjeev M. Naik, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/151,584

(22) Filed: Jun. 13, 2005

(51) Int. Cl.
*G06F 15/00* (2006.01)
*F02P 5/15* (2006.01)

(52) U.S. Cl. .................... 701/111; 73/117.3; 123/406.2

(58) Field of Classification Search ................ 701/111, 701/114, 102, 110; 73/116, 117.3; 123/406.2, 123/406.24
See application file for complete search history.

(56) References Cited

U.S. PATENT DOCUMENTS 5,668,725 A * 9/1997 Naik ......................... 701/111
6,439,198 B1 * 8/2002 Lehner et al. ............... 701/111
6,659,077 B1 * 12/2003 Morikami ................... 123/319

FOREIGN PATENT DOCUMENTS

JP          7-34960 A  *  2/1995

* cited by examiner

*Primary Examiner*—Hieu T. Vo
(74) *Attorney, Agent, or Firm*—Kathryn A. Marra

(57) ABSTRACT

A method and system for detection of continuous single cylinder misfire, by more completely analyzing an estimated periodic sequence of reference period signals, and comparing the periodic sequence with a sample corresponding to an immediately prior revolution, is offered. Data occurring periodically, with a period of one revolution, are eliminated, whereas signals associated with a period of one engine cycle are enhanced. This comprises measuring a sequence of engine reference periods corresponding to a single engine revolution. Transient noise is removed. A first difference is calculated, and a disturbance sequence is estimated, correlatable to a single engine cycle. A difference is calculated and compared to a threshold. The threshold comprises an array of calibrated values, determined based upon engine operating speed and engine load.

10 Claims, 4 Drawing Sheets

CONTINUOUS CYLINDER MISFIRE DETECTION METHOD

TECHNICAL FIELD

This invention pertains generally to internal combustion engine control systems, and more specifically to detection of engine misfire events.

INCORPORATION BY REFERENCE

Applicant incorporates by reference U.S. Pat. No. 5,668,725, entitled: Internal Combustion Engine Misfire Detection, issued to Naik, in that the method and apparatus for monitoring engine speed to detect intermittent engine misfire events, including removal of transient changes in engine speed variation that vary in a periodic sense with a period of one engine revolution or one engine cycle, need not be fully described in detail herein.

BACKGROUND OF THE INVENTION

Engine manufacturers are mandated to detect engine misfire events as an element of state and federal on-board diagnostics regulations. The regulations require detection of various forms of engine misfire, including intermittent misfire, one cylinder continuous misfire, and two opposing cylinder misfire tests. Designers and manufacturers of internal combustion engines employ various detection schemes, including detection of misfire based upon variations in rotational speed of the engine crankshaft. Crankshaft speed analysis is the adopted approach for many engine applications due to its direct linkage to engine torque. Engine torque is the primary quantity affected upon occurrence of cylinder misfire, and crankshaft speed variation provides a direct means to detect associated changes.

Crankshaft speed variation monitoring algorithms to monitor engine operation may be unable to identify all occurrences of engine misfire, due to variations in system implementation that introduce errors inducing signal noise. Signal noise may affect the ability of a misfire detection method to detect misfire, especially at high engine speeds on some engine applications. Issues related to system implementation that may affect signal noise include, for example, part-to-part variation in crankshaft wheel tooth machining, and variations in engine torque between cylinders, due to variations in delivery of fuel, air, spark, and exhaust gas recirculation. Variation in signal level, i.e., change in engine speed due to occurrence of a misfire, is necessarily low under conditions of low engine load. In general, misfire detection is difficult under low load, high-speed conditions, especially for engines with a large number of cylinders and large levels of powertrain and driveline inertia. Furthermore, misdiagnosis of engine misfire events may lead to costly, and potentially ineffective service procedures.

Other methods have been proposed to improve misfire detection, including, by way of example, U.S. Pat. No. 5,668,725, entitled: Internal Combustion Engine Misfire Detection, issued to Naik, comprising a method and apparatus for monitoring engine speed to detect intermittent engine misfire events. The aforementioned crankshaft speed variation method significantly improves the misfire detection accuracy of intermittent misfires. The method may be unable to detect continuous single cylinder misfires in specific engine applications, e.g., wherein an individual cylinder continuously misfires within a specific speed/load operating range otherwise undetectable using normal monitoring methods. In such instances, a misfiring cylinder may exhibit itself as a periodic signal consistent within a reference period and having a period of one engine cycle. This periodic sequence is estimated and removed from the data, and the resultant output of the method may not be detected.

Therefore, what is needed is a more effective method to monitor engine speed variation to detect single cylinder engine misfire, especially such misfire events as may continuously occur at specific engine speed/load operating points.

SUMMARY OF THE INVENTION

In accordance with the present invention, an improvement is offered for detection of continuous cylinder misfire, by more completely analyzing an estimated periodic sequence of reference period signals, and comparing the periodic sequence with a sample corresponding to an immediately prior engine revolution. This eliminates any components periodic with a period of one revolution, while enhancing signals associated with a period of one engine cycle.

The present invention provides an improvement over conventional engine controls by providing a system and a method to monitor operation of an internal combustion engine for occurrence of a continuous single cylinder engine misfire. This comprises measuring a sequence of reference periods, each corresponding to a single revolution of the engine. The transient noise is removed from the measured sequence of reference periods. A first difference is calculated for the measured sequence of reference periods with the transient noise removed, and a disturbance sequence is estimated, said disturbance sequence correlatable to at least one cycle of the engine. A difference is calculated between the first difference of the measured sequence of reference periods with the transient noise removed, and, the estimated disturbance sequence, and the calculated difference is compared to a threshold.

Another aspect of the invention comprises monitoring engine operation to detect a continuous single cylinder engine misfire event comprises detecting single-cylinder continuous misfire occurring at specific engine operating conditions.

Another aspect of the invention comprises measuring the sequence of reference periods occurring immediately prior to each cylinder firing event.

Another aspect of the invention comprises selecting a threshold from an array of calibrated values, based upon engine operating speed and engine load.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
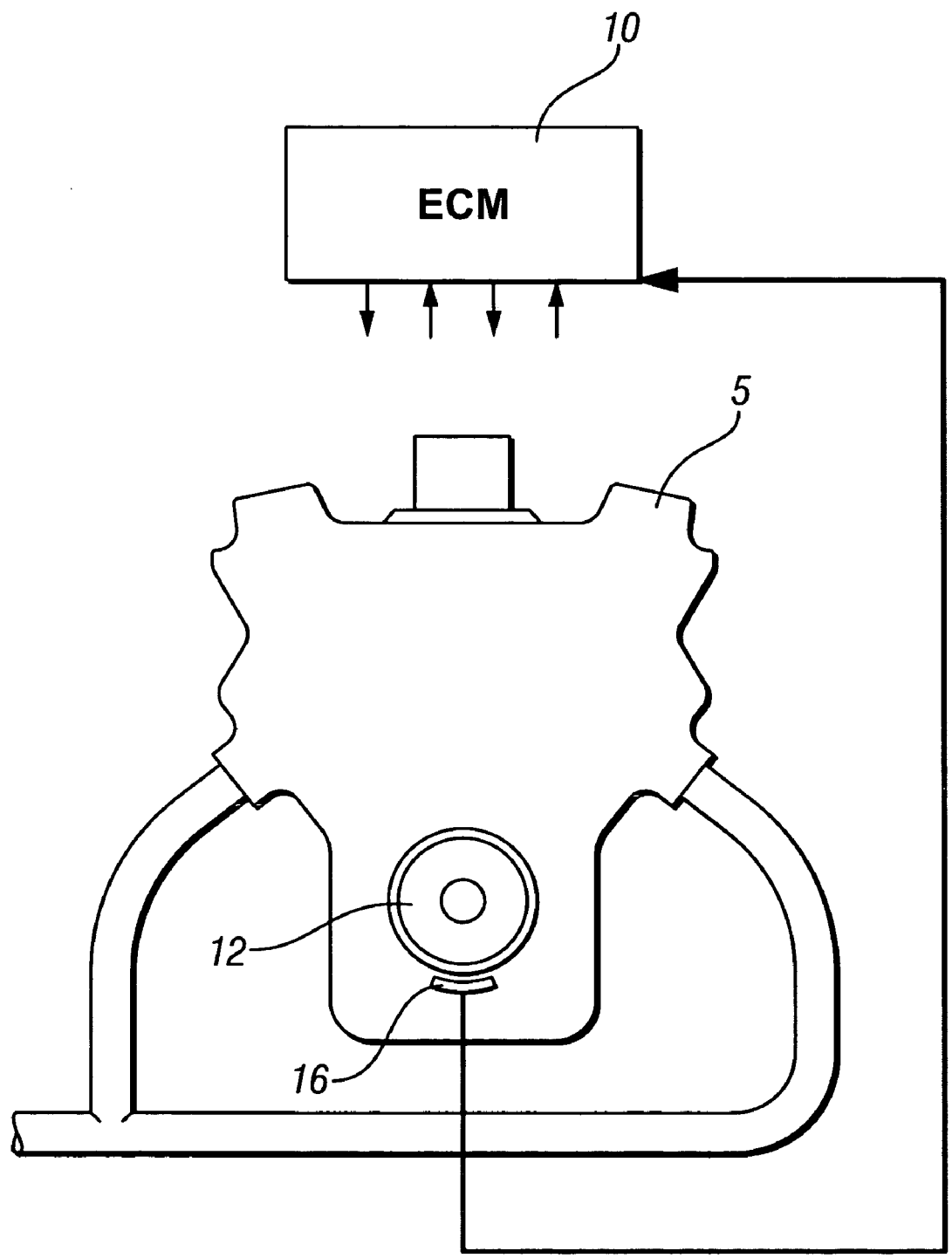
FIG. 1 is a schematic diagram of an engine and control system, in accordance with the present invention.

Referring now to the drawings, wherein the showings are for the purpose of illustrating the invention only and not for the purpose of limiting the same, FIG. 1 shows an internal combustion engine 5 and control system 10 which has been constructed in accordance with an embodiment of the present invention. The exemplary engine 5 preferably comprises a conventional multiple-cylinder, internal combustion engine having a plurality of pistons, each corresponding to one of the cylinders. Each piston moves linearly along the longitudinal axis of the cylinder in response to combustion events and rotation of a crankshaft. The crankshaft, to which all the cylinders are operably connected via connecting rods, is mounted in main bearings of the engine block. A crank wheel 12 is preferably operably attached to an end of the crankshaft, and rotates with crankshaft rotation. The crank wheel 12 includes a plurality of teeth placed at or near its outer circumference. One of the teeth is placed at least every ninety degrees of engine rotation, corresponding to a top-dead center position of one of the pistons, although there may be additional teeth placed thereon. A crank sensor 16, typically a Hall-effect sensor, is placed adjacent the crank wheel and is operable to detect passage of each tooth. The exemplary engine 5 includes an air intake system, a fuel delivery system, an exhaust system, a spark-ignition system, and various other emissions and control systems, including exhaust gas recirculation and evaporative purging, each known and not described in detail herein. The internal combustion engine of this exemplary embodiment is a conventional modern four-cycle, eight-cylinder, spark-ignition engine, with the cylinders arranged in a V-configuration.

Each engine system and sensor, including the crank sensor 16, is preferably monitored and controlled by electronic controller 10 containing machine-executable code operable to sense one or more operating parameters, and control actuators to effect proper operation of the engine, in response to operator inputs and predetermined calibrations and controls. The controller 10 is operable to determine an elapsed time between passage of consecutive teeth of the crank wheel.

The controller 10 is preferably an electronic control module comprised of a central processing unit signally electrically connected to volatile and non-volatile memory devices via data buses. The memory devices preferably include RAM devices, ROM devices, and data buffers. The controller includes an analog-to-digital converter for obtaining signal data, and a plurality of output drivers for controlling a corresponding plurality of output devices, each operable to control an aspect of engine operation. The controller 10 is attached to sensing devices and output devices via wiring harnesses, to monitor and control engine operation. Typical output devices include subsystems necessary for proper control and operation of the engine 5, including, by way of example, the aforementioned air intake system, fuel delivery system, spark-ignition system, exhaust gas recirculation system, evaporative control system, and the various other emissions and control systems. Typical sensing devices include devices operable to monitor engine operation, external conditions, and operator demand, and are typically signally attached to the controller 10. Control algorithms are typically executed during preset loop cycles so each control algorithm is executed at least once each loop cycle. Loop cycles are typically executed each 3, 6, 15, 25 and 100 milliseconds during engine operation. Other algorithms may be executed in response to some form of interrupt signal sent to the controller from one of the external sensors. Use of the controller 10, having various control algorithms and calibrations, to control operation of the internal combustion engine 5 is well known to one skilled in the art.

Figure 2:
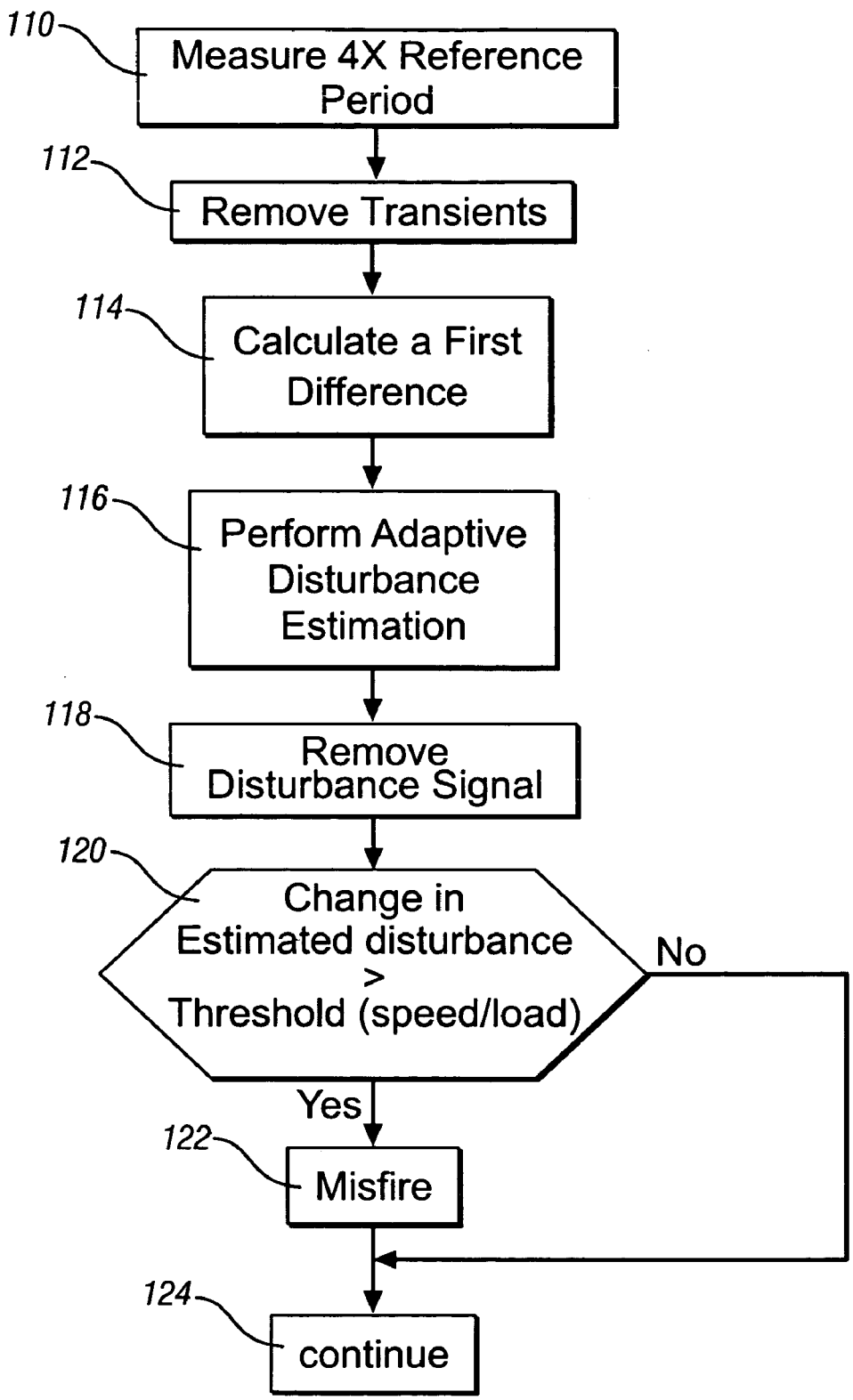
FIG. 2 is a flowchart illustrating steps of an exemplary algorithm for diagnosing engine misfire, in accordance with the present invention; and, FIGS. 3–6 are graphic representations of data, in accordance with the present invention.

Referring now to FIG. 2, a flowchart for an algorithm is provided. The algorithm is preferably executable as part of embedded software in the engine controller 10 during ongoing engine operation, and is operable to detect continuous engine misfire, in accordance with the present invention. The algorithm includes the steps of: measuring a sequence of reference periods corresponding to a single revolution of the engine (Block 110); removing transient noise from the measured sequence of reference periods (Block 112); calculating a first difference of the measured sequence of reference periods with the transient noise removed (Block 114); estimating a disturbance sequence, correlatable to at least one revolution of the engine (Block 116); removing the revolution based component in the estimated disturbance sequence by calculating a difference between the estimated disturbance sequence and an estimated disturbance sequence determined in a prior revolution; (Block 118); and, comparing the calculated difference to a threshold (Block 120). A misfire event, comprising a continuous single cylinder misfire within a range of engine operation, is indicated when the calculated difference exceeds the threshold (Block 122). Execution of the algorithm discontinues until a subsequent sequence of reference periods corresponding to a single revolution of the engine occurs (Block 124). Each of the steps is detailed hereinbelow, using equations to describe the calculations. A skilled practitioner is able to generate appropriate microprocessor-executable code based upon the equations, in accordance with the algorithm described with reference to FIG. 2.

Figure 3:
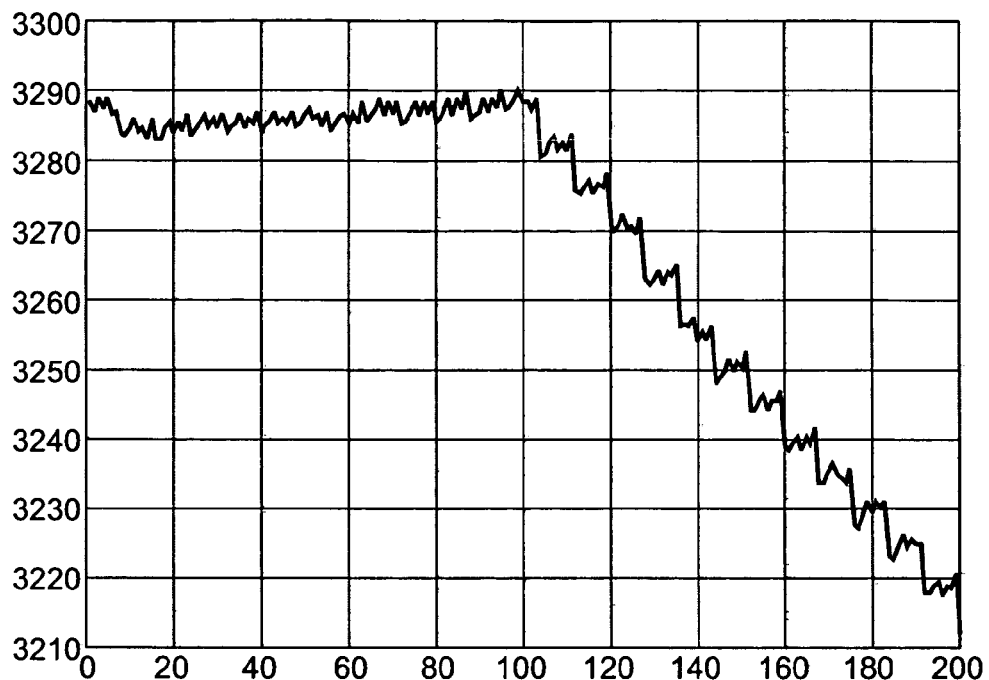

Measuring a sequence of reference periods corresponding to a single revolution of the engine crankshaft preferably comprises monitoring input from the crank sensor 16, and measuring elapsed time since passage of the immediately prior crankwheel tooth, which comprises, elapsed time for the engine crankshaft to rotate ninety degrees, in this application. The measured elapsed time is referred to as the reference period, or T(n). Each measured T(n) is sequentially stored in one of the data buffers in the controller. Each crankshaft rotation, or engine revolution, consists of four consecutive reference periods. The reference periods are preferably measured for the sequence of reference periods occurring immediately prior to each cylinder firing event (Block 110). An exemplary sequence of reference period data, comprising engine crankshaft speed data measured on a vehicle with deliberately induced continuous misfire on one cylinder is shown, with reference to FIG. 3.

Figure 4:
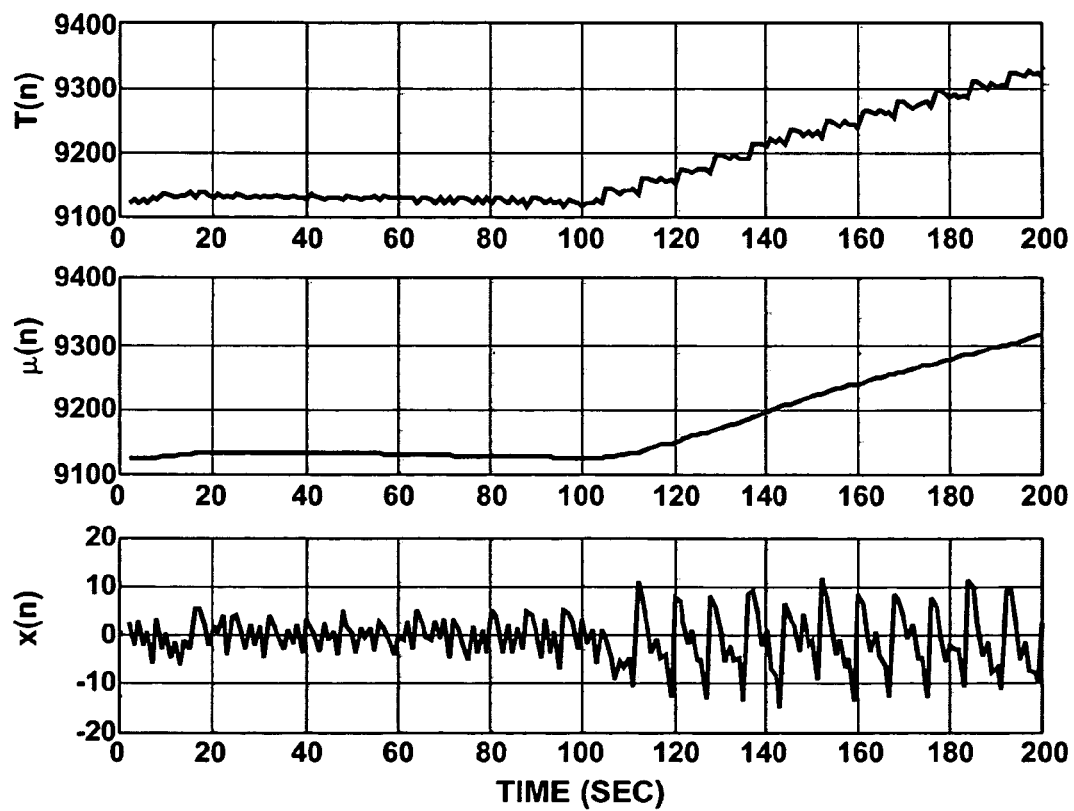

Transient noise is removed from the measured sequence of reference periods (Block 112). This is shown graphically, with reference to FIG. 4. An arithmetic mean of a block of reference period measurements, centered about the current reference period measurement is regularly and continually computed. The mean is subtracted from the reference period measurements. The block of reference period measurements is centered about the current measurement to optimize execution time to compute the mean. The preferred block size is an integral number of engine cycles. The mean computation is done recursively (Block 114). FIG. 4 shows exemplary 4X reference period data T(n), estimated transient sequence μ(n), and reference period data, x(n) after transient removal, which has been determined for the exemplary reference period data previously shown with reference to FIG. 3. The estimated transient sequence μ(n), is calculated using Equation 1, below, and reference period data, x(n) after transient removal is calculated using Equation 2, below.

Data comprising a block size of $L_1 = m_1 N$ reference period measurement data are captured, wherein $m_1 = 2$, and N is the number of teeth per engine cycle. The value N is equal to the number of cylinders, in this application. The latest $L_1$ data samples are stored in a first in, first out ("FIFO") buffer of length $L_1$, referred to as BUFFER1, and executed in the controller 10. When the most recent sample is n, BUFFER1 contains samples $n-L_1+1$ through n. The current sample is defined to be sample $n-L_1/2+1$. The mean of the block corresponding to the current sample is calculated to be the average of all the reference period measurement samples currently in BUFFER1. The reference period measurement sequence, shown with reference to FIG. 4, is denoted by T(n) and the running mean sequence is denoted by $\mu(n)$.

The running mean sequence, $\mu(n)$, is the running average of the reference period samples and is recursively calculated as follows:

$$\mu(n)=\mu(n-1)+(T(n+L_1/2-1)-T(n-L_1/2-1))/L_1. \quad (1)$$

A reference period measurement sequence with running means removed, x(n), is calculated as:

$$x(n)=T(n)-\mu(n). \quad (2)$$

The first difference of the sequence, x(n), is computed to obtain sequence y(n), from which the disturbance sequence is adaptively estimated and removed, as follows:

$$y(n)=x(n)-x(n-1). \quad (3)$$

Initially, sequence y(n) is used to denote the differenced sequence of reference period measurements that have been compensated for transients as given above. A quasi-periodic disturbance is removed from the signal. The disturbance is modeled as:

$$d(n) = a_0 + \sum_{k=1}^{N}\left[a_k\cos\left(\frac{2\pi k n}{2N}\right) + b_k\sin\left(\frac{2\pi k n}{2N}\right)\right], \quad (4)$$

wherein N is the number of teeth per engine revolution and $b_N=0$. Thus, the disturbance, d(n), is described through 2N coefficients.

The parameters $a_k$ and $b_k$, comprising estimates that minimize error between the reference period measurements and the disturbance sequence, are computed (Block 116). In this embodiment, for N=4, the disturbance, d(n), is expressed as:

$$d(n) = [a_0, a_1, b_1, a_2, b_2, a_3, b_3, a_4] * \begin{bmatrix} 1 \\ \cos\left(\frac{\pi n}{4}\right) \\ \sin\left(\frac{\pi n}{4}\right) \\ \cos\left(\frac{\pi n}{2}\right) \\ \sin\left(\frac{\pi n}{2}\right) \\ \cos\left(\frac{3\pi n}{4}\right) \\ \sin\left(\frac{3\pi n}{4}\right) \\ \cos(\pi n) \end{bmatrix} =: \theta^T\phi(n). \quad (5)$$

In order to equate the norms of the different basis functions, $\phi(n)$ is redefined to be:

$$\phi(n) = \begin{bmatrix} 1 \\ \sqrt{2}\cos\left(\frac{\pi n}{4}\right) \\ \sqrt{2}\sin\left(\frac{\pi n}{4}\right) \\ \sqrt{2}\cos\left(\frac{\pi n}{2}\right) \\ \sqrt{2}\sin\left(\frac{\pi n}{2}\right) \\ \sqrt{2}\cos\left(\frac{3\pi n}{4}\right) \\ \sqrt{2}\sin\left(\frac{3\pi n}{4}\right) \\ \cos(\pi n) \end{bmatrix}. \quad (6)$$

A least squares (LS) estimate of the parameter coefficient vector $\theta$ based on L observations is modeled as:

$$\hat{\theta}(n) = \left[\sum_{i=n-L+1}^{n}\phi(i)\phi(i)^T\right]^{-1}\sum_{i=n-L+1}^{n}y(i)\phi(i) = \frac{1}{L}\sum_{i=n-L+1}^{n}y(i)\phi(i). \quad (7)$$

The parameter estimates are adapted over time by basing the estimates only on the quantity, $L_2$, most recent reference period measurements, wherein $L_2=m_2N$, with $m_2$ being an integer.

Figure 5:
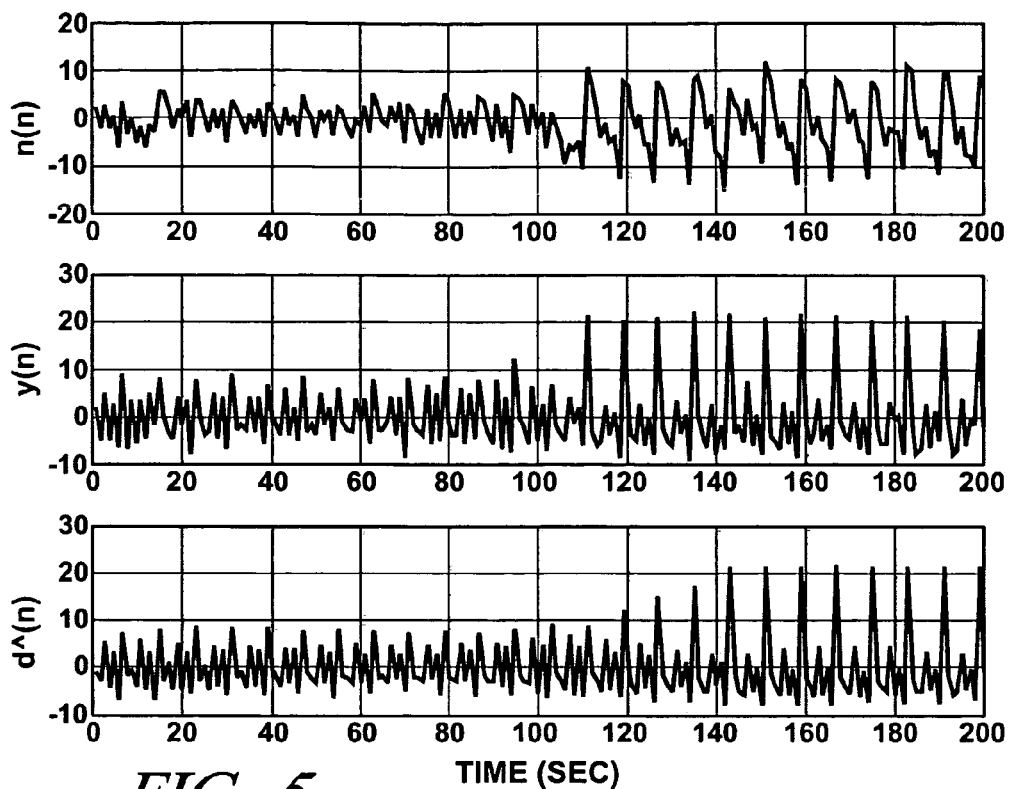

Referring now to FIG. 5 and block 116 of FIG. 2, the adaptive disturbance removal is now detailed. A recursive computational procedure is executed for adaptive disturbance removal, including the following recursive update equation for the parameter estimate vector:

$$\hat{\theta}(n)=\hat{\theta}(n-1)+\phi(n)(y(n)-y(n-L_2))/L_2. \quad (8)$$

The disturbance estimate, $\hat{d}(n)$, is calculated (block 116) as:

$$\hat{d}(n)=\hat{\theta}^T(n-1)\phi(n). \quad (9)$$

Finally, this disturbance estimate is removed (block 118) from the differenced reference period with mean removed, y(n), to arrive at the cleaned signal z(n) as:

$$z(n)=y(n)-\hat{d}(n). \quad (10)$$

For intermittent misfire detection, the signal z(n) is compared to a threshold. This operation, described in above-referenced U.S. Pat. No. 5,668,725, entitled: Internal Combustion Engine Misfire Detection, issued to Naik, provides a method and apparatus for monitoring engine speed to detect intermittent engine misfire events, including removal of transient changes in engine speed variation that vary in a periodic sense with a period of one engine revolution or one engine cycle.

Referring again to FIG. 5, results of computing y(n) and $\hat{d}$ (n), starting with x(n) are shown. For one cylinder continuous misfire detection, a change in estimated disturbance sequence, $\Delta\hat{d}$ (n), comprising the difference of the estimated disturbance sequence from its corresponding value N samples previous, is computed, wherein N is the number of samples per revolution, using equation 11:

$$\Delta\hat{d}(n)=\hat{d}(n)-\hat{d}(n-N). \quad (11)$$

Figure 6:
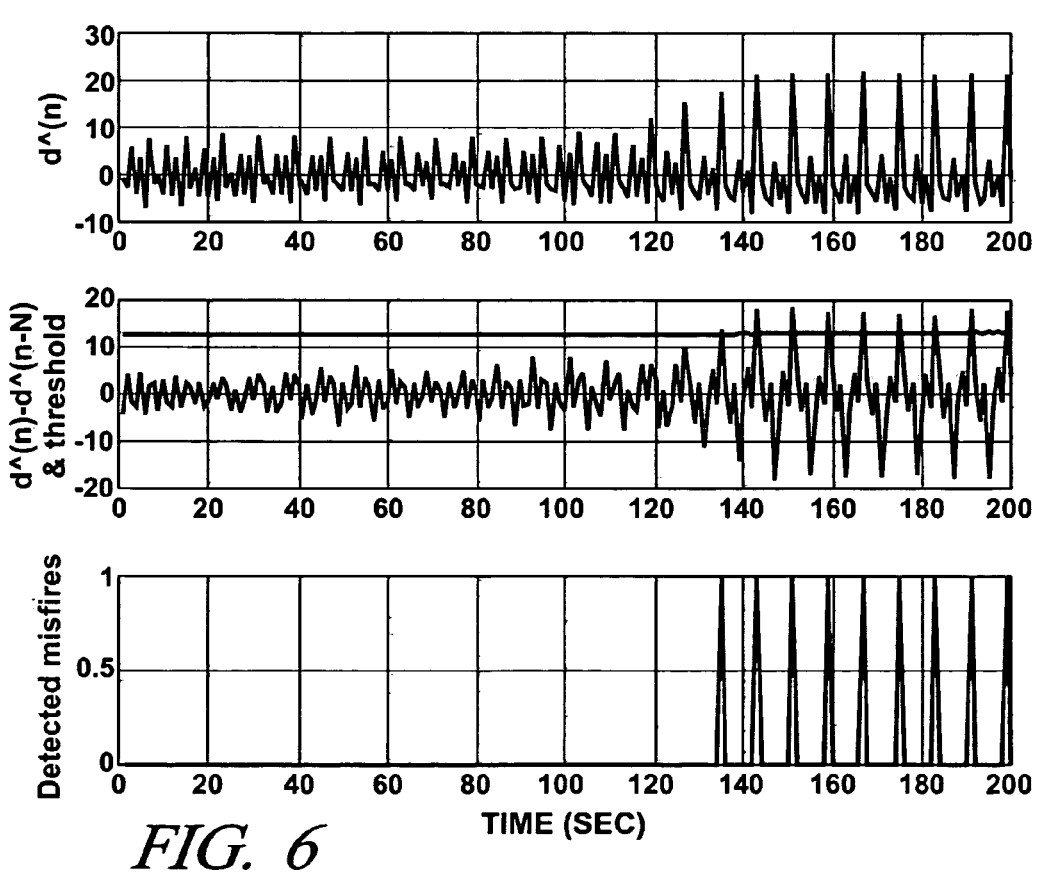

Referring now to FIG. 6, and blocks 120 and 122 of FIG. 2, continuous cylinder misfire is determined when the change in estimated disturbance sequence, $\Delta\hat{d}(n)$, exceeds a certain threshold for more than one engine cycle. FIG. 6 shows results for the exemplary data of FIG. 3, previously presented.

Thresholds for misfire detection are preferably calibration values determined during preproduction engine development. Thresholds typically comprise an array of values, corresponding to ranges of engine operating speeds and engine loads. A skilled practitioner is able to determine appropriate levels of the estimated disturbance sequence, $\Delta \hat{d}(n)$, that indicate engine misfire for various engine operating speed and engine load conditions.

The invention has been described with specific reference to the preferred embodiments and modifications thereto. Further modifications and alterations may occur to others upon reading and understanding the specification. It is intended to include all such modifications and alterations insofar as they come within the scope of the invention.

The invention claimed is:

1. Method to detect continuous single cylinder engine misfire in an internal combustion engine, comprising:
    measuring a sequence of reference periods corresponding to a single revolution of the engine;
    removing transient noise from the measured sequence of reference periods;
    calculating a first difference of the measured sequence of reference periods with the transient noise removed;
    estimating a disturbance sequence;
    calculating a difference between the estimated disturbance sequence, and, an estimated disturbance sequence determined in a prior revolution; and,
    comparing the calculated difference to a threshold.

2. The method of claim 1, wherein measuring a sequence of reference periods corresponding to a single revolution of the engine comprises:
    monitoring a signal input from an engine crank sensor; and,
    measuring elapsed time between contiguous input signals.

3. The method of claim 2, wherein measuring a sequence of reference periods corresponding to a single revolution of the engine further comprises: measuring the sequence of reference periods occurring immediately prior to each cylinder firing event.

4. The method of claim 1, wherein removing transient noise from the measured sequence of reference periods comprises: subtracting a value from each reference period of the measured sequence of reference periods equal to an arithmetic mean of reference periods measured for an integral number of engine cycles.

5. The method of claim 1, wherein estimating a disturbance sequence comprises estimating a trigonometric-based disturbance function correlatable to at least one cycle of the engine.

6. The method of claim 1, wherein comparing the calculated difference to a threshold further comprises: selecting the threshold from an array of predetermined threshold values, based upon engine operating speed and engine load.

7. Method to monitor operation of an internal combustion engine, comprising:
    monitoring engine operation to detect an engine misfire, comprising:
    measuring a sequence of reference periods corresponding to a single revolution of the engine;
    removing transient noise from the measured sequence of reference periods;
    calculating a first difference of the measured sequence of reference periods with the transient noise removed;
    estimating a disturbance sequence, said disturbance sequence correlatable to at least one revolution of the engine;
    calculating a difference between the estimated disturbance sequence, and, an estimated disturbance sequence determined in a prior revolution; and,
    comparing the calculated difference to a threshold.

8. The method of claim 7, wherein monitoring engine operation to detect an engine misfire comprises: monitoring engine operation to detect a continuous, single cylinder misfire.

9. The method of claim 8, wherein monitoring engine operation to detect a continuous single cylinder engine misfire, comprises detecting single-cylinder continuous misfire occurring at specific operating conditions.

10. Article of manufacture having program instructions for monitoring an internal combustion engine for continuous misfire in a single cylinder, comprising: a storage medium for said program instructions; said program instructions comprising:
    code for acquiring signal input from an engine crank sensor;
    code for measuring a sequence of reference periods corresponding to a single revolution of the engine;
    code for removing transient noise from the measured sequence of reference periods;
    code for calculating a first difference of the measured sequence of reference periods with the transient noise removed;
    code for estimating a disturbance sequence correlatable to at least one revolution of the engine;
    code for calculating a difference between the estimated disturbance sequence, and, an estimated disturbance sequence determined in a prior revolution; and,
    code for comparing the calculated difference to a threshold.

* * * * *